Dec. 14, 1926.
J. D. SANDERSON
1,610,973
MILK BOTTLE CAP
Filed Feb. 14, 1925
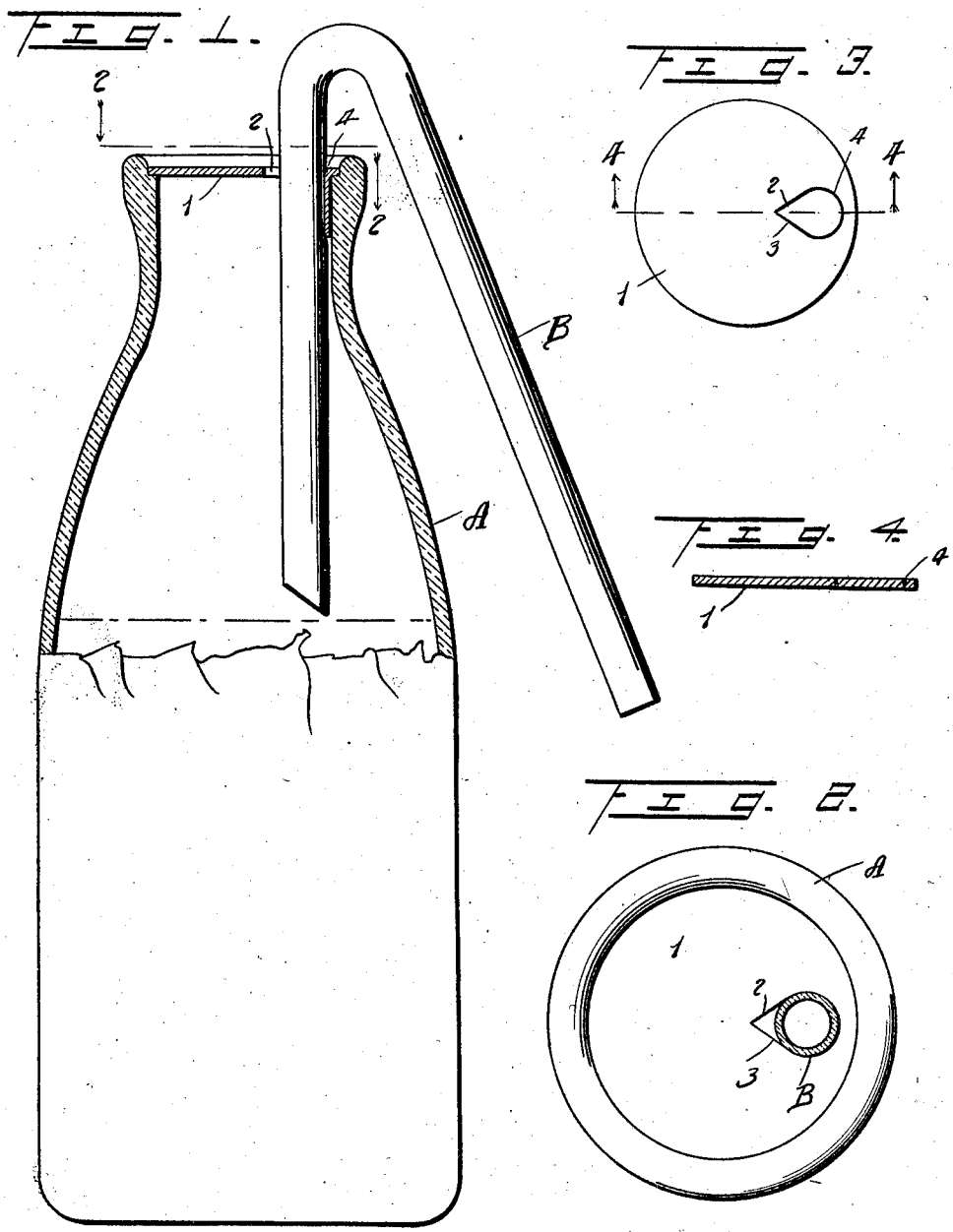
Inventor

Patented Dec. 14, 1926.

1,610,973

UNITED STATES PATENT OFFICE.

JOSEPH D. SANDERSON, OF VALLEJO, CALIFORNIA.

MILK-BOTTLE CAP.

Application filed February 14, 1925. Serial No. 9,209.

The invention relates to milk bottle caps for closing the mouths of milk bottles and the like, and has for its object the provision of a cap having a weakened portion that may be punched out so that the cream may be dispensed from the top of the milk by means of a siphon as shown in the drawings, said weakened portion also admitting of the insertion of an instrument for removal of the cap from the bottle.

Another object of the invention is the provision of a weakened portion of an outline that will provide a vent opening when the device is in operation to assist in the withdrawal of the cream from the bottle.

The invention will be described in detail hereinafter and will be found illustrated in the accompanying drawings, in which—

Figure 1 is a side view partly broken away of a milk bottle showing the improved cap in position and the siphon extractor for the cream in operation, Figure 2 is a section on the line 2—2 of Figure 1, Figure 3 is a top plan view of the bottle cap, and Figure 4 a section on the line 4—4 of Figure 3.

In the drawings similar reference characters will be used to designate corresponding parts throughout the views.

The milk bottle cap is formed of paperboard or other suitable material and is designated at 1. The cap is formed with a weakened portion by means of an outline punch, said weakened portion being enclosed within a continuous cut that extends nearly through the cap, said cut comprising two straight lines 2 and 3 at an angle to one another and meeting in a point as shown, and the ends of said lines joined by means of a curved line 4. Said weakened portion is as shown approximately near the edge of the cap and the angle formed by the straight lines 2 and 3 is adjacent the center of the cap.

When the cap is in position on a bottle A, as shown in Figures 1 and 2, and a siphon such as shown at B is used to withdraw the cream from the top of the milk in the bottle, the siphon may be inserted in the bottle without removing the cap by forcing the portion enclosed by the outlined cuts 2, 3, and 4 inwardly and the withdrawal of the cream may be started through the siphon by canting the bottle until the cream starts to flow. The opening in the cap between the cuts 2 and 3 forms a vent, thus making it unnecessary to remove the cap during the siphoning operation.

Furthermore, it will be understood that the weakened portion may be utilized to insert an implement, such for instance as an end of a siphon for removal of the cap from the bottle.

What is claimed is:—

A milk bottle cap made of fibrous material and having an outline cut through one surface thereof, said outline cut comprising two straight lines at an angle to one another, and the ends of said straight lines joined by a curved line, the portion enclosed by the outline cuts aforesaid being adapted to be punched from the cap for the insertion of a dispensing tube fitting the larger portion of the opening partly defined by the curved line, and the space between the converged straight lines forming a vent.

In testimony whereof I affix my signature.

JOSEPH D. SANDERSON.